United States Patent
Wildgruber

[15] 3,644,926
[45] Feb. 22, 1972

[54] CHECKBACK SYSTEM FOR VISUAL AND AUDIBLE INDICATION OF DETECTED PROCESSES

[72] Inventor: Otto Wildgruber, Erlangen, Germany
[73] Assignee: Siemens Aktiengesellschaft, Berlin, Germany
[22] Filed: Nov. 3, 1969
[21] Appl. No.: 873,456

[30] Foreign Application Priority Data
Nov. 14, 1968 Germany .................. P 18 08 773.5

[52] U.S. Cl. .................. 340/412, 317/155.5, 340/213.1
[51] Int. Cl. .................................................. G08b 23/00
[58] Field of Search .............. 340/213.1, 412; 317/155.5

[56] References Cited

UNITED STATES PATENTS

| | | | |
|---|---|---|---|
| 2,709,250 | 5/1955 | Marmorstone | 340/213.1 X |
| 2,985,869 | 5/1961 | Arrasmith | 340/213.1 |
| 3,229,274 | 1/1966 | Riley et al. | 317/155.5 X |
| 3,234,541 | 2/1966 | Paull | 340/213.1 X |
| 3,264,499 | 8/1966 | Moser et al. | 317/155.5 X |
| 3,365,622 | 1/1968 | Pearse | 317/155.5 X |
| 3,427,521 | 2/1969 | Goldstein | 317/155.5 X |

*Primary Examiner*—Thomas B. Habecker
*Attorney*—Curt M. Avery, Arthur E. Wilfond, Herbert L. Lerner and Daniel J. Tick

[57] ABSTRACT

A checkback system for visual and audible indication of detected processes comprises a mosaic switchboard assembly having a plurality of identical modules. Each of the modules provides a continuous visual signal when it is in inoperative condition and an intermittent visual signal when it is in operative condition.

4 Claims, 1 Drawing Figure

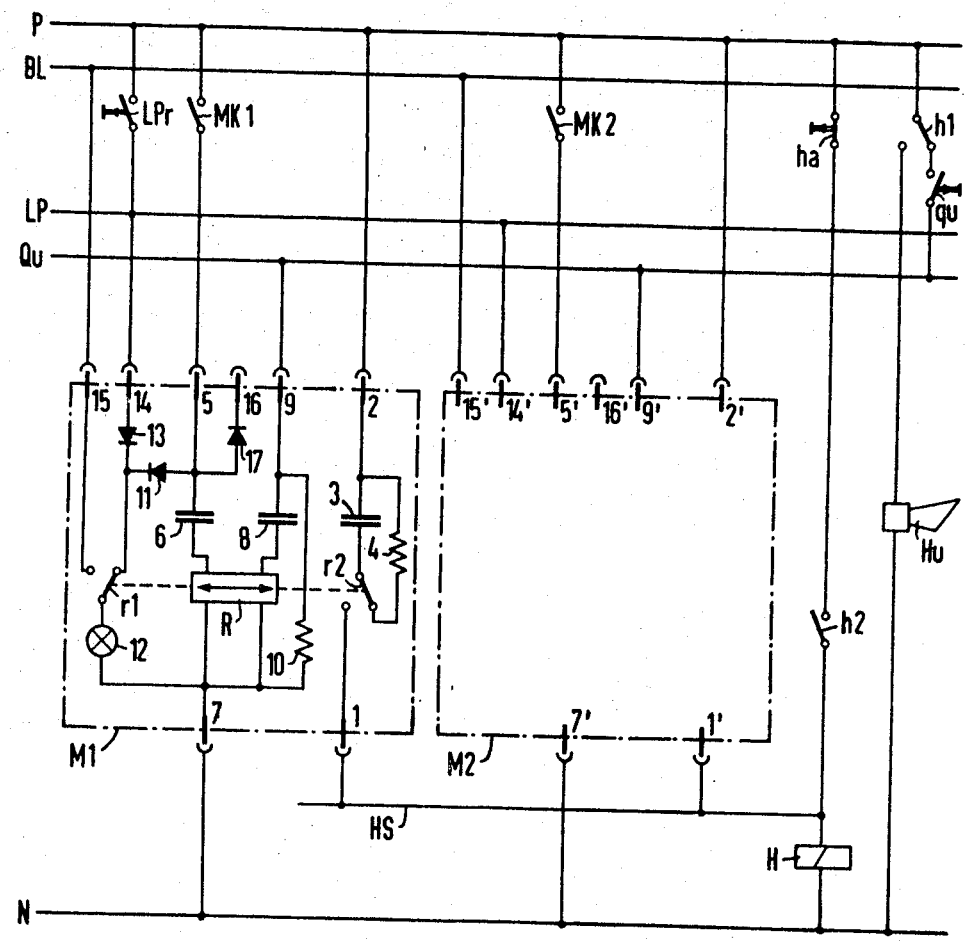

CHECKBACK SYSTEM FOR VISUAL AND AUDIBLE INDICATION OF DETECTED PROCESSES

DESCRIPTION OF THE INVENTION

The invention relates to a checkback system for detecting various processes. More particularly, the invention relates to a checkback system for visual and audible indication of detected processes.

In order to supervise or control the various functions or operations of an electrical installation, pilot or condition-responsive switches are provided at many locations of the installation. The pilot switches are switched in position or condition when the position or condition of another switch varies upon the exceeding of the permissible operating temperature, the occurrence of deviations in velocity of machines, and so on. In order to evaluate the processes or operations detected by the pilot switches, a large-scale electrical installation is provided with a monitor or supervising board at one locality thereof. The monitor board converts the variations in the switch positions or conditions of the pilot switches of the installation to visual and audible signals.

With regard to the foregoing, it is known to connect pilot lamps, which provide a visual indication of individual signals, to an intermittent source of energy at a time such signals arrive. This results in intermittent energization or blinking of the pilot lamps. After the visual indication is acknowledged, the blinking light is changed to a continuous or steady light. This is accomplished by the operation of an acknowledging switch or key. The continuous light remains on for as long as the signal is present.

The principal object of the invention is to provide a new and improved checkback system for visual and audible indication of detected processes.

An object of the invention is to provide a checkback system for visual and audible indication of detected processes which utilizes a single relay.

An object of the invention is to provide a checkback system for visual and audible indication of detected processes, which system is of simple structure, but functions with efficiency, effectiveness and reliability.

An object of the invention is to provide a checkback system for visual and audible indication of detected processes, which system comprises a mosaic switchboard assembly comprising a plurality of modules, each module having a single relay and a single pilot lamp controlled thereby.

In accordance with the invention, a checkback system for visual and audible indication of detected processes comprises a plurality of identical circuits. Each of the circuits comprises a relay having two stable conditions, first and second energizing windings interconnected by no more than one pole, and a relay switch contact controlled by the windings, the relay switch contact having two closed positions. A pilot switch has an open position and a closed position. A capacitor is connected in series circuit arrangement with the pilot switch and one end of the first winding of the relay. A source of DC energizing voltage has a positive polarity terminal and a negative polarity terminal. The series circuit arrangement is connected to the positive polarity terminal of the DC energizing voltage source. A coupling couples one end of the second winding of the relay to the positive polarity terminal of the DC energizing voltage source. The coupling includes an acknowledging switch having an open position and a closed position provided in common for the circuits. The second winding is connected to the positive polarity terminal of the DC energizing voltage source via the acknowledging switch. A further coupling couples the other end of each of the first and second windings of the relay to the negative polarity terminal of the DC energizing voltage source. A source of intermittent voltage is provided. A pilot lamp is connected in series circuit arrangement with the switch contact of the relay between the other end of the first winding of the relay and a common point in the connection between the pilot switch and the capacitor when the switch contact is in one of its closed positions. Thereby, in the inoperative condition of the checkback system, the pilot lamp is connected to the pilot switch and is continuously energized, whereas in the operative condition of the checkback system, the pilot lamp is intermittently energized via the source of intermittent voltage when the switch contact is in its other closed position.

Each of the circuits comprises a module and the modules comprise a mosaic switchboard assembly.

The coupling includes another capacitor. The relay has a second relay switch contact having two closed positions. Each module of the checkback system further comprises another capacitor and an audible alarm relay connected in series circuit arrangement with the second switch contact between the positive and negative polarity terminals of the source of DC energizing voltage when the second relay switch contact of the relay is in one of its closed positions upon energization of the relay.

In order that my invention may be readily carried into effect, it will now be described with reference to the accompanying drawing, wherein the single FIGURE is a circuit diagram of an embodiment of the checkback system of the invention.

The FIGURE illustrates a mosaic switchboard assembly comprising a plurality of modules M1, M2, and so forth. Each module M1, M2, and so on, is identical and each comprises the checkback system of the invention. Since the modules M1, M2, and so on, are identical, the invention will be described with reference to the module M1. The module M1 is provided with a pilot or indicating switch MK1 and the module M2 is provided with a pilot or indicating switch MK2.

The modules M1, M2, and so on, are supplied in common with a DC energizing voltage from a DC energizing voltage source having a positive polarity terminal P and a negative polarity terminal N. A lamp-testing bus bar LP is utilized to test the lamp 12 of the module M1 and the corresponding lamps of the other modules. An acknowledgement bus bar Qu is utilized to energize a common acknowledgement switch qu. A source of intermittent voltage is connected to an intermittent bus bar BL. An audible alarm Hu, which may comprises any suitable audible alarm such as, for example, a buzzer or horn, provides an audible signal, in common, for all the modules M1, M2, and so on. The audible alarm Hu is connected between the positive and negative polarity terminals P and N of the source of energizing voltage in series circuit arrangement with a relay switch contact h1 of an audible alarm relay H.

The energizing winding of the audible alarm relay H is connected in series circuit arrangement with another relay switch contact h2 and an audible alarm silencing switch ha between the positive and negative polarity terminals P and N of the source of energizing voltage. The audible alarm relay H controls the relay switch contacts h1 and h2 in position. The relay switch contact h2 functions as a self-holding contact for the audible alarm relay H. The audible alarm relay winding H is energized via an audible alarm bus bar HS. The audible alarm bus bar HS is connected to an output terminal 1 of the module M1, and an output terminal 1' of the module M2, and so on.

When the audible alarm Hu is to be operated or actuated, an input terminal 2 of the module M1, an input terminal 2' of the module M2 and the corresponding input terminal of each of the other modules, has a positive potential applied thereto. A capacitor 3 is connected in series circuit arrangement with the input terminal 2. The series circuit arrangement of the input terminal 2 of the capacitor 3 is connected to the fixed end of a relay switch contact r2 of a relay R of the module M1. The relay switch contact r2 has two closed positions. In one closed position, which is opposite to that shown in the FIGURE, the relay switch contact r2 connects the input terminal 2 to the output terminal 1. In the other closed position of the relay switch contact r2, which is that shown in the FIGURE, said relay switch contact connects the capacitor 3 to a discharge resistor 4.

The relay R has two stable conditions and includes first and second energizing windings interconnected by no more than one pole. Thus, when the relay R is in its deenergized or nonoperative condition, the discharge resistor 4 is connected in parallel with the capacitor 3 via the relay switch contact $r2$ of said relay. The relay R also has a relay switch contact $r1$ having two closed positions. An incoming signal switches over the relay R. If a current pulse is then provided from the positive polarity terminal P to the negative polarity terminal N, via the capacitor 3, the audible alarm bus bar HS and the audible alarm relay winding H, said audible alarm relay winding is energized and switches the relay switch contact $h1$ to its position opposite that shown in the FIGURE. This connects the audible alarm H$u$ between the positive and negative polarity terminals P and N of the source of energizing voltage, so that said audible alarm is actuated or energized and produces an audible signal.

The module M1 is connected to its corresponding pilot switch MK1 via an input terminal 5, the module M2 is connected to its corresponding pilot switch MK2 via an input terminal 5', and so on. The pilot switch MK1 is switched to its closed position, opposite the position shown in the FIGURE, when a signal is present. When the pilot switch MK1 is switched to its closed position it connects the input terminal 5 of its corresponding module, which is the module M1 in this case, to the positive polarity terminal P of the source of energizing voltage. A capacitor 6 is connected in series circuit arrangement with the input terminal 5 to one end of the first of the two windings of the relay R. The relay R has two stable end positions and one of its windings must be excited or energized for a brief period of time in order to switch over the relay.

The other end of the first of the windings of the relay R is connected to the negative polarity terminal N of the source of energizing voltage via an output terminal 7. A capacitor 8 is connected in series circuit arrangement with an input terminal 9 to one end of the second of the two windings of the relay R. The input terminal 9 is connected directly to the acknowledging bus bar Q$u$. A discharge resistor 10 is connected in parallel with the series circuit arrangement of the capacitor 8 and the second winding of the relay R.

The capacitor 6 discharges via a current path which includes a diode 11, the relay switch contact $r1$ in its position shown in the FIGURE, a pilot lamp 12 and the first winding of the relay R. The pilot lamp 12 is between the output terminal 7 and the fixed contact of the relay switch contact $r1$. When the relay switch contact $r1$ is in its position shown in the FIGURE, said relay switch contact and the pilot or indicating lamp 12 are connected in series circuit arrangement with a diode 13 and an input terminal 14 of the module M1. The input terminal 14 is connected to the lamp-testing bus bar LP. The lamp-testing bus bar LP is connected to the positive polarity terminal P of the source of energizing voltage via a lamp-testing switch LP$r$ which is provided in common for all the modules of the switchboard assembly.

When the relay switch contact $r1$ is switched to its other closed position, opposite that shown in the FIGURE, said relay switch contact, the pilot lamp 12 and an input terminal 15 of the module M1 are connected in series circuit arrangement and said series circuit arrangement is connected directly to the intermittent voltage bus bar BL. An output terminal 16 is provided to deliver a group signal to a central point or to some other remote location. The output terminal 16 is connected to the input terminal 15 via a diode 17, so that a positive potential is provided when the corresponding pilot or indicating switch MK1 is switched to its closed position.

The checkback system of my invention functions or operates in the following manner. When the pilot or indicating switch MK1, MK2, closes or is switched to its closed position, opposite its position shown in the FIGURE, a current pulse flows from the positive polarity terminal P to the negative polarity terminal N via the capacitor 6 and the first winding of the relay R. As a result, the relay R is switched to its operative condition and controls its relay switch contact $r1$ and $r2$ so that said relay switch contacts are moved to their closed positions opposite those shown in the FIGURE. The relay switch contact $r1$ thus connects the pilot lamp 12 to the intermittent voltage bus bar BL via one pole and the input terminal 15. The pilot lamp 12 is thus intermittently energized or lighted.

The relay switch contact $r2$ transmits a current pulse from the positive polarity terminal P to the negative polarity terminal N via the capacitor 3, the audible alarm bus bar HS and the audible alarm relay H. The audible alarm relay H is thus energized or excited and thereby controls its relay switch contact H1 so that said relay switch contact is moved to its closed position opposite that shown in the FIGURE. When the relay switch H1 is in its closed position, opposite that shown in the FIGURE, it energizes the audible alarm H$u$. The audible alarm H$u$ produces an audible signal, and continues to produce such audible signal until acknowledgement is made by depressing the switch $ha$. When the switch $ha$ is depressed it opens the energizing circuit of the audible alarm relay H.

When the operator recognizes the signal or information, he depresses the acknowledgement switch $qu$. The acknowledging switch $qu$ is connected between the acknowledging bus bar Q$u$ and the positive polarity terminal P of the source of energizing voltage, via the relay switch contact $h1$, when said relay switch contact is in its closed position, shown in the FIGURE. When the acknowledging switch $qu$ is depressed, a positive potential is thus applied to the acknowledging bus bar Q$u$, thereby applying a positive potential to the input terminal 9 of each of the modules. Thus, a current flows through the capacitor 8 and the second winding of the relay R of each of the modules. The relay R is thereby switched over again to its deenergized nonoperative condition and the pilot lamp 12 is connected in single-pole connection with the pilot or indicating switch MK1 via the relay switch contact $r1$, which is switched to its closed position, shown in the FIGURE. If a signal is still present, the pilot lamp 12 will remain continuously energized or lighted. If a signal is no longer present, the pilot lamp 12 will become deenergized and will go out.

Instead of utilizing the capacitor 8 to switch the relay R back to its deenergized condition, with the assistance of the common acknowledging switch $qu$, it is possible to utilize a series resistor. The series resistor must have a resistance value which, together with the resistance of the relay winding, is such that current flowing via the series connection will be low enough so that the switchover of the relay is prevented when the pilot switch MK1 is closed, during the acknowledging operation.

It is thus possible to produce two different signal conditions in the single pilot or indicating lamp 12 in the checkback system of the invention by utilizing the single relay R having two stable conditions. Furthermore, the operation or energization of the relay R, which is effected only by current pulses, results in the power requirement being dependent only upon the energy which is applied to the pilot lamp 12. This permits the installation of the relay R and the pilot lamp 12, as well as the other circuit components, into a module without too much thermal stress. Thus, the installation of the modules into a mosaic switchboard assembly eliminates the need for additional wiring expense or supporting members for the relays in the construction of the mosaic modules.

In order to determine whether all the pilot lamps 12 of the individual modules are in good condition, a positive potential may be applied to the lamp-testing bus bar LP by depressing the lamp-testing switch LP$r$. A positive potential will then be applied to all the pilot lamps 12 whose corresponding relays R are in deenergized condition. The potential is applied via the input terminal 14 and the diode 13 of each module. Since the remaining pilot lamps are intermittently energized, in any case, all of said lamps must be energized when the lamp-testing switch LP$r$ is depressed.

A positive potential always occurs at the output terminal 16 when the pilot switch MK1 of the module is switched to its open position, as shown in the FIGURE. The output terminal 16 of the module is decoupled by the diode 17, so that the output terminals 16 of all the modules may be combined and delivered as a group signal, to a central point.

While the invention has been described by means of a specific example and in a specific embodiment, I do not wish to be limited thereto, for obvious modifications will occur to those skilled in the art without departing from the spirit and scope of the invention.

I claim:

1. A checkback system for visual and audible indication of detected processes, said checkback system comprising a plurality of identical circuits, each of said circuits comprising a relay having two stable conditions, first and second energizing windings interconnected by no more than one pole, and a relay switch contact controlled by said windings, said relay switch contact having two closed positions;

a pilot switch having an open position and a closed position;

a capacitor connected in series circuit arrangement with said pilot switch and one end of the first winding of said relay;

a source of DC energizing voltage having a positive polarity terminal and a negative polarity terminal, said series circuit arrangement being connected to the positive polarity terminal of said DC energizing voltage source;

coupling means coupling one end of the second winding of said relay to the positive polarity terminal of said DC energizing voltage source, said coupling means including an acknowledging switch having an open position and a closed position provided in common for said circuits, said second winding being connected to the positive polarity terminal of said DC energizing voltage source via said acknowledging switch;

further coupling means coupling the other end of each of the first and second windings of said relay to the negative polarity terminal of said DC energizing voltage source;

a source of intermittent voltage; and a pilot lamp connected in series circuit arrangement with the switch contact of said relay between said other end of the first winding of said relay and a common point in the connection between said pilot switch and said capacitor when said switch contact is in one of its closed positions whereby in the inoperative condition of said checkback system said pilot lamp is connected to said pilot switch and is continuously energized when said pilot switch is in its closed position, whereas in the operative condition of said checkback system said pilot lamp is intermittently energized via said source of intermittent voltage when said switch contact is in its other closed position.

* * * * *